(12) United States Patent
Strong

(10) Patent No.: US 12,262,803 B1
(45) Date of Patent: Apr. 1, 2025

(54) TRIFOLD SEATBELT DOCUMENT HOLDER

(71) Applicant: Jonathan Strong, Stroudsburg, PA (US)

(72) Inventor: Jonathan Strong, Stroudsburg, PA (US)

( * ) Notice: Subject to any disclaimer, the term of this patent is extended or adjusted under 35 U.S.C. 154(b) by 104 days.

(21) Appl. No.: 18/115,861

(22) Filed: Mar. 1, 2023

Related U.S. Application Data

(63) Continuation of application No. 16/710,108, filed on Dec. 11, 2019, now abandoned.

(51) Int. Cl.
  *A45C 11/18* (2006.01)
  *B60R 11/00* (2006.01)
(52) U.S. Cl.
  CPC ......... *A45C 11/18* (2013.01); *A45F 2200/055* (2013.01); *B60R 2011/0031* (2013.01)
(58) Field of Classification Search
  CPC ... A45C 11/18; A45F 2200/055; B60R 22/00; B60R 2022/4866; B60R 2011/0031
  See application file for complete search history.

(56) References Cited

U.S. PATENT DOCUMENTS

| | | | | |
|---|---|---|---|---|
| 4,921,273 A | * | 5/1990 | Weightman | B60R 22/00 280/808 |
| D465,324 S | * | 11/2002 | Matthew | D2/639 |
| D489,890 S | * | 5/2004 | Gorham, Jr. | D2/639 |
| 6,763,625 B2 | * | 7/2004 | Durham | G09F 21/04 74/551.8 |
| D648,920 S | * | 11/2011 | Dorsey | D2/639 |
| 2007/0204498 A1 | * | 9/2007 | Clevenger | G09F 3/14 40/672 |
| 2009/0256411 A1 | * | 10/2009 | Vallowe | G09F 3/207 297/482 |
| 2014/0124554 A1 | * | 5/2014 | Van Kort | G09F 3/20 224/539 |

* cited by examiner

*Primary Examiner* — Corey N Skurdal

(57) ABSTRACT

A trifold document holder includes a first foldable section with a hook and loop fastener strip, an intermediate section with a transparent zippered pocket extending to the end of a second foldable section. The second section includes a second transparent pocket and a credit card holder. The second section is folded over the intermediate section and engages the first section in a hook and loop arrangement securing the holder about a seatbelt.

5 Claims, 4 Drawing Sheets

TRIFOLD SEATBELT DOCUMENT HOLDER

CROSS REFERENCE TO RELATED APPLICATIONS

This application is a Continuation in Part Application based on patent application Ser. No. 16/710,108 filed Dec. 11, 2019.

STATEMENT REGARDING FEDERALLY SPONSORED RESEARCH OR DEVELOPMENT

Not Applicable.

PARTIES TO A JOINT RESEARCH AGREEMENT

Not Applicable.

DESCRIPTION

Field of the Invention

This invention relates generally to seatbelts and more particularly to a document holder removably attached about a seatbelt which secures documents internally in a trifold arrangement.

Background of the Invention

Currently, the most common location for documents in a vehicle is the glove compartment. Drivers are required to have vehicle registration, insurance cards, and driver's licenses in a vehicle and ready to be provided if required by authorities. Unfortunately, these documents are often lost or can't be found when necessary in a glove compartment filled with miscellaneous storage.

Another problem arises when a document has expired and not replaced by a current valid insurance card, registration, etc. Complicating the situation is the fact that the documents often expire at different times and require constant replacement.

Prior art patents in the vehicle seatbelt art do not address the problem noted above, for example U.S. Pat. No. 7,419,026 to Midorikawa is directed to tension varying means involving a seatbelt; U.S. Pat. No. 7,364,200 to Downy is directed to a vehicle seatbelt restraining apparatus and U.S. Pat. No. 4,921,273 to Weightman is directed to a shoulder belt minicover and cushion which may include a reflective surface to indicate the seatbelt is in use.

U.S. Pat. No. 6,763,615 to Durham relates to a Vehicle Crossbar/Shoulder-Strap Cover With Display Pocket. In a second embodiment Durham shows a shoulder strap comfort pad with a small vertical external pocket holder open to one end and situated entirely in a central fold.

It is also noted that U.S. Pat. Nos. 5,775,398 and 5,431,207 to Seigel on Card Holders do not appear to be relevant.

This invention is intended to resolve the problems of the prior art by providing a trifold wallet which is attached about the seatbelt so that the documents placed therein are readily available, accessible and visible. The wallet includes a transparent zippered pouch with an opening extending lengthwise within the wallet in alignment with the seatbelt and hook and loop fasteners at each end of the holder and on opposite sides which fold over the pocket and attach to one another at the rear of the seatbelt.

SUMMARY OF THE INVENTION

This invention relates to document holders for a vehicle and particularly to a unique trifold arrangement attached about a seatbelt. The invention is intended to make vehicle documents such as insurance cards, registration, etc. secure, readily available and accessible.

The document holder or wallet comprises a trifold design wherein the documents are visible in a transparent pocket or pouch after removal of the wallet from the seatbelt. The wallet includes hook and loop folds at each end which overlap the seatbelt and engage one another on the rear of the belt. The hook and loop folds lock the holder in place about the seatbelt. The outer surface of the wallet can provide notice of a concealed weapon permit or a logo or print. For emphasis, the notice may be reflective.

In one embodiment, the document holder includes a transparent zippered pocket which extends longitudinally along the holder and folds about the seatbelt. A slotted credit card holder may also be included in an outer fold.

Accordingly, the object of this invention is to provide a new and improved holder for documents in a vehicle.

Another object of this invention is to provide a unique trifold wallet which is attached about a seatbelt and is designed to hold various documents particularly those pertaining to the vehicle.

A further object of this invention is to provide a new and improved method and apparatus which comprises a document holder which attaches about a seatbelt and includes a transparent inner pouch portion which holds vehicle documents.

A more specific object of this invention is to provide a trifold document holder which includes an internal zippered transparent pouch which extends from a first fold to one end of the holder and includes opposite hook and loop end portions which fold over the seatbelt and mate in the rear to secure the holder about to the seatbelt.

Another object of this invention is to provide a new and improved trifold seatbelt document holder which includes a transparent longitudinal zippered pocket and an outer fold which includes slots for credit cards mounted over the pocket.

BRIEF DESCRIPTION OF THE DRAWINGS

This disclosure will now provide a more detailed and specific description that will refer to the accompanying drawings. The drawings and specific descriptions of the drawings, as well as any specific or alternative embodiments discussed are intended to be read in conjunction with the entirety of this disclosure. These embodiments are provided by way of illustration only and so this disclosure will be thoroughly complete and fully convey understanding to those skilled in the art. More specifically.

DETAILED DESCRIPTION OF THE INVENTION

Figure 1:
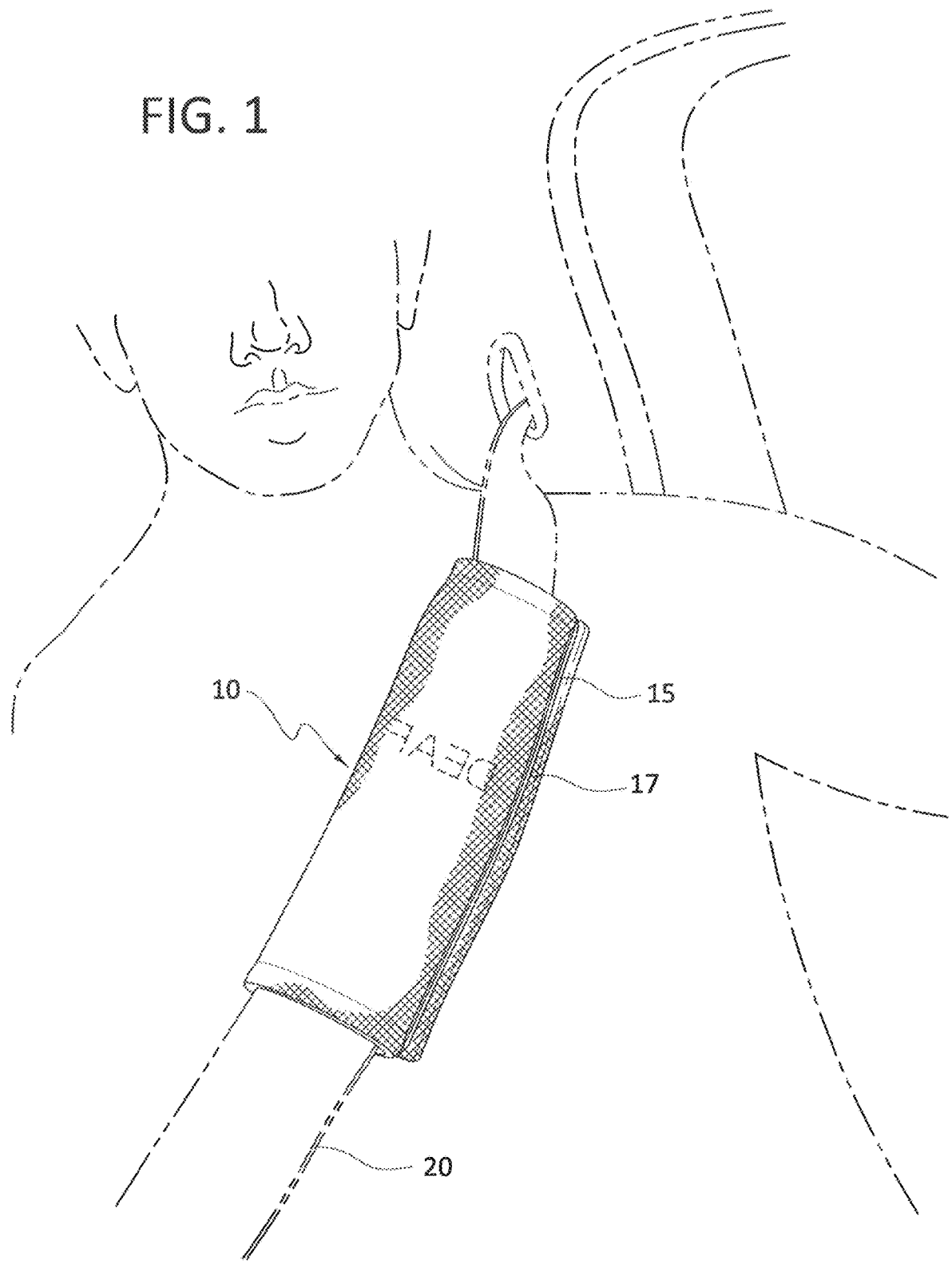
FIG. 1 it is a front view of the document holder or trifold wallet attached about a seatbelt, which is shown in phantom with a driver.

The present invention is directed to a unique trifold vehicle document holder 10 which attaches about a seatbelt 20 and provides ready and convenient access to the documents 13.

This unique document holder 10 is designed to mount about a seatbelt 20 so that the documents 13 required by a State motor vehicle agency or police are always readily available and secure. See FIG. 2. This is particularly relevant in motor vehicle stops when individuals have to rummage in a glove compartment, sometimes at night, and often come up with an expired insurance card or registration or none at all.

The holder 10 is designed to fit the width 11 of the seatbelt 20 with a transparent pouch 12 into which documents 13 are placed such as the vehicle registration, insurance card and various other documents. A zipper 14 is positioned horizontally along the upper portion of the pouch 12 to seal the documents 13 therein. The pouch 14 is attached to a cloth backing 31 with stitching 32.

Figure 2:
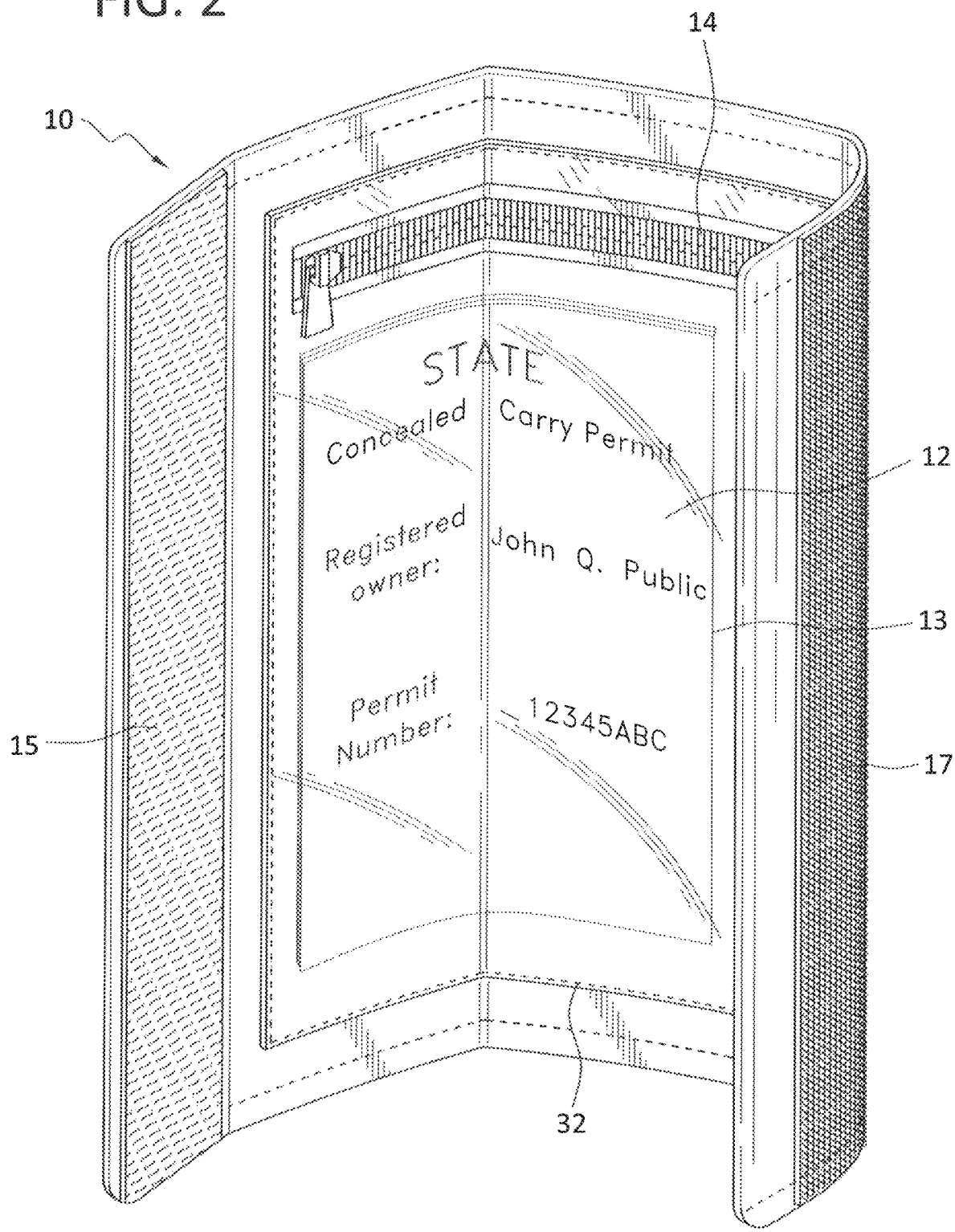
FIG. 2 is a perspective view of the invention with a hook end portion which folds over the document viewing holder portion of the invention and mates with a second loop end portion on the rear to secure the holder about a seatbelt.

As further shown in FIG. 2, the holder 10 includes foldable outer portions 15 and 17 at each end of the centrally positioned pouch 12. The outer portion 15 is a hook portion stitched to the cloth backing 31 and engaging the rear loop portion 17 to attach the holder 10 about the seatbelt 20.

The holder 10 is approximately 8 inches square before the outer portions 15 and 17 are folded over about the seatbelt 20. To secure the holder 10 about the seatbelt 20, the hook and loop portions 15 and 17 engage one another but can be readily pried apart. A zipper 14 is also located on the upper portion of the pouch 12 to secure the documents in place. The rear outer portion of the hook and loop ends is a soft cloth material 31 which contacts the driver as shown in FIG. 1 and is designed to be comfortable.

Figure 3:
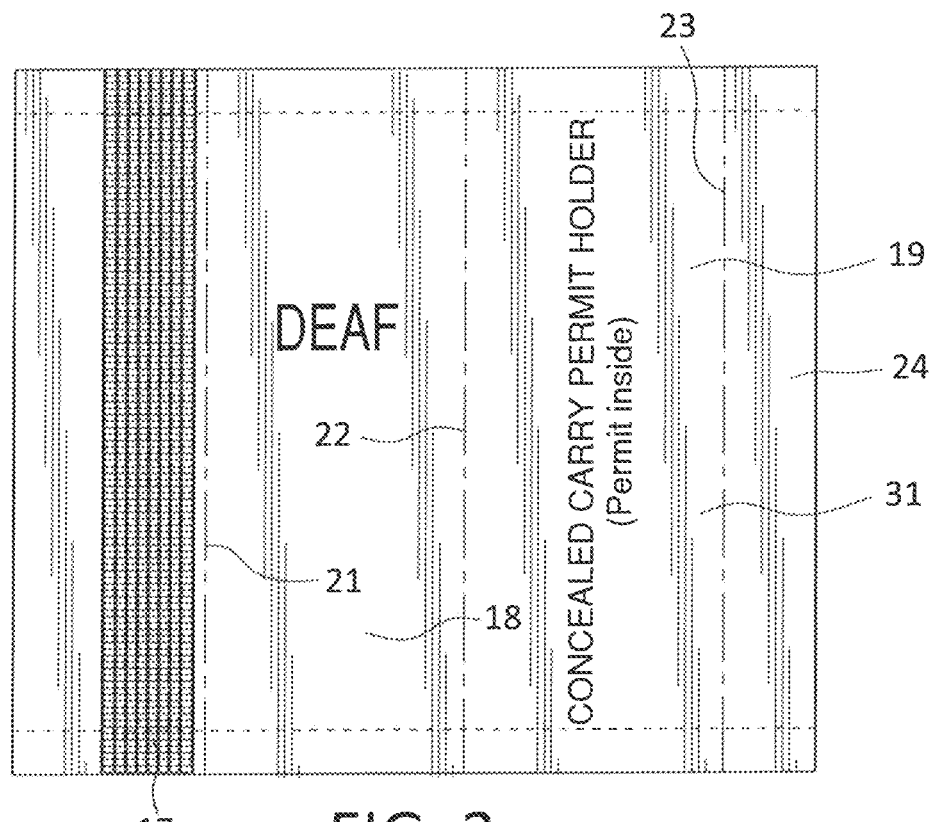
FIG. 3 is a rear view of the document holder with an end loop portion which engages the front hook portion to attach the holder about a seatbelt.
Figure 4:
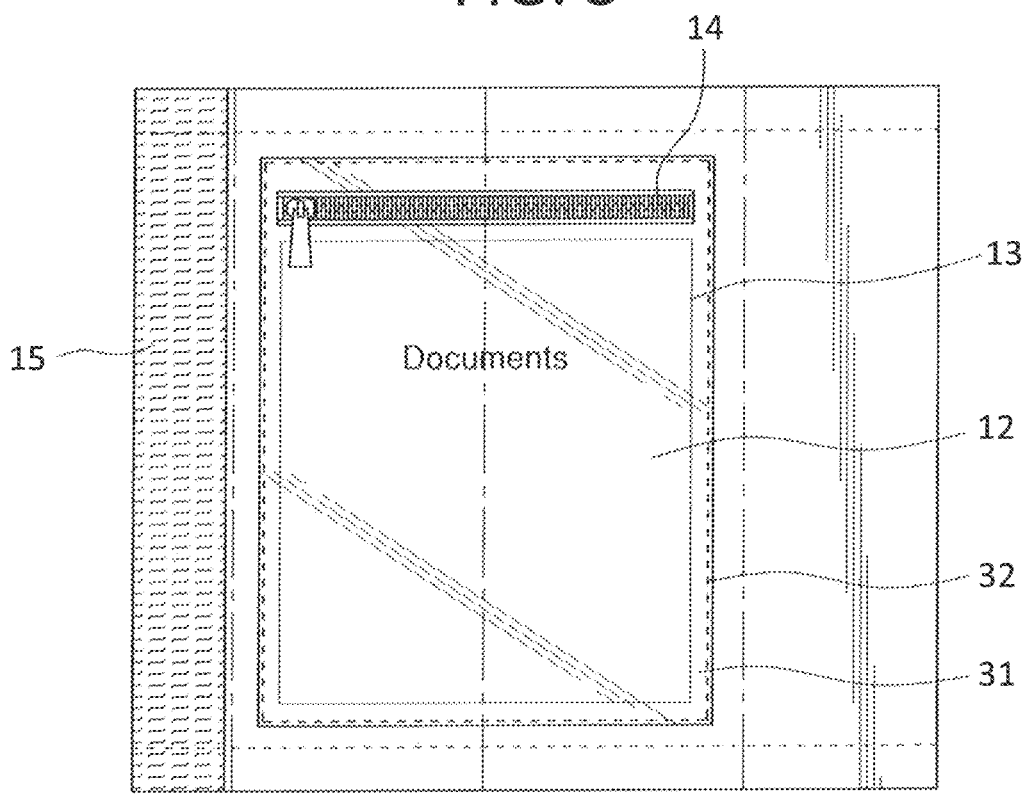
FIG. 4 is a front view of the document holder 180° from the view of FIG. 3.

FIG. 3 depicts the rear outside of the holder 10 which is approximately 8 inches square and foldable. The rear includes a hook portion 17 at one end and customized sections 18 and 19 with fold lines 21, 22 and 23 and end portion 24. The section 18 may include a logo with a notice, for example, that the driver is deaf. The section 19 may also include a reflective concealed carry notice to alert officers that the driver is legitimately in possession of firearm.

In use, documents 13 are places within the pouch 12 and the zipper 14 closed. The holder 10 is then folded about the seatbelt 20 with the hook and loop portions 15 and 17 engaging to fasten the holder in place as shown in FIG. 1. The holder is readily removed by separating the hooks and loop portions 17 and 15. The invention thus provides a convenient inexpensive and secure location for vehicle documents.

Figure 5:
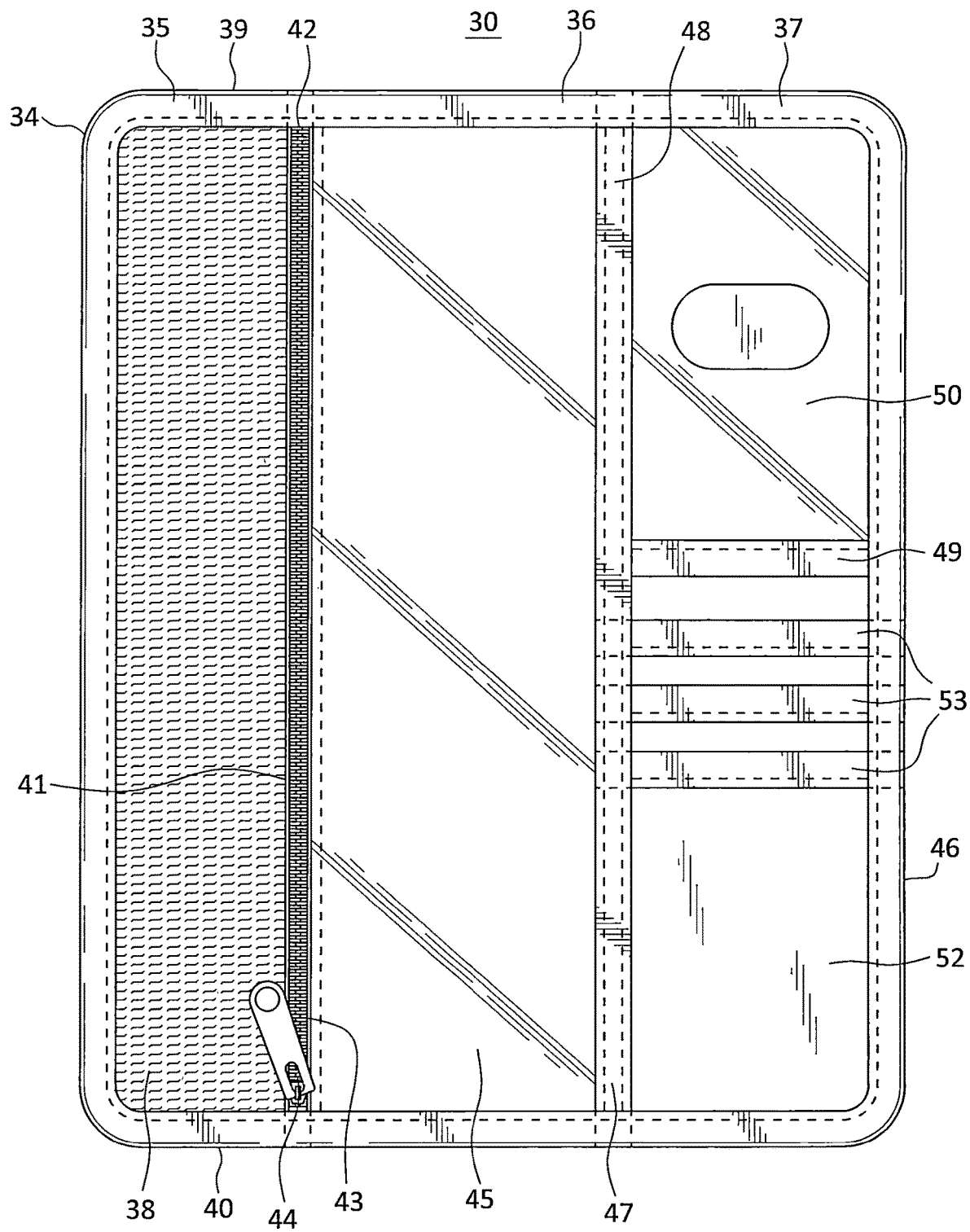
FIG. 5 is a front view of an alternate embodiment of the trifold document holder invention showing a transparent zippered pocket opening extending longitudinally along a fold to the ends of the holder and a second fold having a strip extending along and over the pocket with a second transverse pocket and slots for credit cards wherein the second fold encloses the zippered pocket internally and mates with hook and loop fasteners on a third fold.

In the alternate embodiment FIG. 5 the Trifold Document Holder 30 comprises a rectangular cloth body 34 having three foldable sections a first side section 35, and intermediate section 36 and a second side section 37. The first side section 35 includes a hook strip 38 extending lengthwise from the top 39 to the base 40 of the section 35. A first zipper element 41 is mounted to the side section 35 at the foldable junction 42 with the intermediate section 36. A mating zipper element 43 is attached to the pocket opening 44 of a first pocket 45 which extends the length of the intermediate section 36. The zipper 41, 43 seals documents within pocket 45. The stitching and positioning off the zipper element 41 along the fold 42 allows an actual Trifold design and facilitate proper alignment of the hook and loop fastening elements 38 to secure the document holder 30 about a seatbelt 20.

The pocket 45 is transparent to permit viewing of documents and extends transversely from the fold 42 over fold 47 to the end 46 of the second side section 37. A strip 48 is mounted to the top 39 and to the base 40 of the second side section 37. A second transverse strip 49 is mounted to an intermediate point on strip 48 and to the end 46 of section 37. The transverse strip 49 is attached to the first pocket 45 on its opposite side.

The side section 37 includes an upper transparent pocket 50 between the strip 48 and the section end 46 mounted over the first pocket 45. The lower portion of the side section 37 comprises a cloth member 52 having a plurality of transverse slots 53 for credit cards. A mating strip (not shown) is located on the opposite side of section 37 to engage hook strip 38 in a hook and loop connection.

In use, the intermediate section 36 with documents located in the pocket 45 is positioned against a seatbelt 20 and the second side section 37 is folded over the opposite side of the seatbelt 20. The first side section 35 is them folded over to engage the second side section 37 with a hook and loop fattener arrangement.

Different features, variations and multiple different embodiments have been described with various details. What has been described in this application, at times in terms of specific embodiments is done for illustrative purposes only and without the intent to limit or suggest that what has been conceived is only one particular embodiment or specific embodiments. It is to be understood that this disclosure is not limited to any single specific embodiment or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by those of skill in the art relying upon the complete disclosure present at the time of filing.

What is claimed is:

1. A trifold document holder for attachment about a vehicle seatbelt, comprising:

an elongated rectangular cloth member having inner and outer surfaces;

an intermediate portion, a first side portion and a second side portion wherein said second side portion folds over to enclose the intermediate portion and the first side portion folds over and engages the second side portion to secure the holder about a seatbelt; and, wherein, the intermediate portion includes a transparent pocket for documents having an opening extending along the length of the intermediate portion and having a zipper portion mounted to the opening and a mating portion mounted to the cloth surface to secure documents in the pocket and, wherein the pocket extends over the second portion; and, the second portion includes a narrow cloth strip extending lengthwise between the ends of the cloth member and parallel to the pocket opening, a second transparent pocket mounted thereto and to the upper and outer surfaces of the second portion and a cloth member mounted to the strip and the lower and outer surfaces of the second portion and having a plurality of the transverse slots for credit cards, and wherein the outer exterior surface of the second portion includes a lengthwise strip to engage hook and loop fasteners; and, the first portion includes a lengthwise hook and loop strip to fold over and engage the strip on the exterior of the second portion for mounting about a seatbelt.

2. A trifold document holder for attachment about a vehicle seatbelt in accordance with claim 1, wherein:

the outer central portion includes a reflective surface having notices thereon.

3. A trifold document holder for attachment about a vehicle seatbelt in accordance with claim 1, further including:

a second strip mounted to the cloth strip on the second portion at an intermediate point and extending transversely between the second transparent pocket and the slotted cloth portion to the end of the second side portion, said strip being attached to the first transparent pocket.

4. The method of using a document holder mounted about a seatbelt comprising the steps of:

providing a rectangular seatbelt document holder with a first side portion, a second side portion and an intermediate portion;

providing a lengthwise transparent zippered pocket extending within the intermediate and second side portion of the holder;

inserting documents into the pocket;

zippering the pocket to secure the documents in the pocket;

providing hook and loop fasteners along the interior length of the first portion and the exterior length of the second portion;

positioning the holder intermediate portion against a seatbelt;

folding the second side portion over the seatbelt and the intermediate portion with the pocket being included in the fold; and, folding the first side portion to engage the outer surface of the second side portion with hook and loop fasteners to secure the document holder about the seatbelt and the documents internally in the pocket.

5. The method in accordance with claim 3 further including the steps of providing a cloth strip extending along the fold between the intermediate portion and the second side portion;

providing a second transparent pocket and a cloth portion having slots between the cloth strip and the outer end of the second side portion; and, inserting a document in the second transparent pocket and inserting credit cards in the cloth slots.

\* \* \* \* \*